United States Patent [19]

Benveniste et al.

[11] Patent Number: 5,150,953

[45] Date of Patent: Sep. 29, 1992

[54] VIDEOTAPE STORAGE DEVICE

[75] Inventors: Edgar R. Benveniste, 336 Hillcrest Blvd., #419, Inglewood, Calif. 90301; Kenneth A. Tarlow, Santa Monica; Harold Goodman, Beverley Hills, both of Calif.; Gloria H. Benveniste, 101 Udine Way, Los Angeles, Calif. 90077

[73] Assignees: Edgar R. Benveniste; Gloria Benveniste, both of Los Angeles, Calif.

[21] Appl. No.: 747,005

[22] Filed: Aug. 19, 1991

[51] Int. Cl.⁵ .............................. A47B 81/06
[52] U.S. Cl. ......................... 312/9.58; 312/351.3
[58] Field of Search ................. 312/234, 234.3, 13, 312/15, 11, 251, 252

[56] References Cited

U.S. PATENT DOCUMENTS

| | | | |
|---|---|---|---|
| 957,784 | 5/1910 | Liebert | 312/252 X |
| 1,227,323 | 5/1917 | Russell | 312/251 |
| 1,622,771 | 3/1927 | Davis | 312/234 X |
| 2,635,940 | 4/1953 | Fritze | 312/252 X |

Primary Examiner—Joseph Falk
Attorney, Agent, or Firm—Poms, Smith, Lande & Rose

[57] ABSTRACT

An improved videotape storage device comprising a frame with a plurality of videotape containers supported on the frame and with each of the videotape containers carrying respective indicia, such as bright colors, to facilitate identification of a desired one of the containers.

8 Claims, 2 Drawing Sheets

VIDEOTAPE STORAGE DEVICE

FIELD OF INVENTION

This invention relates to videotape storage devices and is particularly directed to improved means for storing videotape which can also assist young children in selecting a desired one of the videotapes contained in the storge device.

PRIOR ART

Videotapes have become widely used as means for entertaining people of all ages. However, their use is especially important for children, since the videotapes can be used to educate, as well as to entertain. Also, since videotape players can be actuated by simply inserting a prerecorded videotape into the tape player and turning on a related television set, it is possible for children to operate the videotape players, even when the children are quite young. This can be extremely important in situations where, for example, a teacher in charge of a large class or a single parent may, due to other demands on their attention, be required to leave a child, with little, if any, supervision, for extended periods of time. If the child can select a desired videotape and can activate the videotape player, they can occupy themselves for very considerable periods of time without requiring supervision. As noted above, videotape players can be activated by simply inserting a prerecorded tape into the videotape player and turning on a related television set. Children, only two or three years of age, can often perform this operation without supervision. However, if a selection must be made between several videotapes, yound children, who have not yet learned to read, have a serious disadvantage since videotapes are substantially identical in appearance apart from their labels.

Videotape storage devices are generally designed for adults, with convenience and security in mind. Thus, lockable cabinets or open racks are generally provided for storing videotapes. However, these devices are not particularly attractive, from a child's point of view, and do nothing to assist a young child in selecting a desired tape from among the plurality of tapes contained in the storage device. Thus, none of the prior art videotape storage devices have been entirely satisfactory.

BRIEF SUMMARY AND OBJECTS OF INVENTION

These disadvantages of the prior art are overcome with the present invention and an improved videotape storage device is provided which is visually attractive to children and which enables even very young children to select a desired one of a plurality of videotapes contained in the storage device.

The advantages of the present invention are preferably attained by providing an improved videotape storage device having a frame with a plurality of videotape containers supported on the frame and with each of the videotape containers carrying respective indicia, such as bright colors, to facilitate identification of a desired one of the containers.

Accordingly, it is an object of the present invention to provide an improved videotape storage device.

Another object of the present invention is to provide an improved videotape storage device which is visually attractive to children.

An additional object of the present invention is to provide an improved videotape storage device which enables even very young children to identify a desired one of a plurality of videotapes contained in the storage device.

A specific object of the present invention is to provide an improved videotape storage device comprising a frame with a plurality of videotape containers supported on the frame and with each of the videotape containers carrying respective indicia, such as bright colors, to facilitate identification of a desired one of the containers.

These and other objects and features of the present invention will be apparent from the following detailed description, taken with reference to the figures of the accompanying drawing.

DETAILED DESCRIPTION OF THE PRESENT INVENTION

Figure 1:
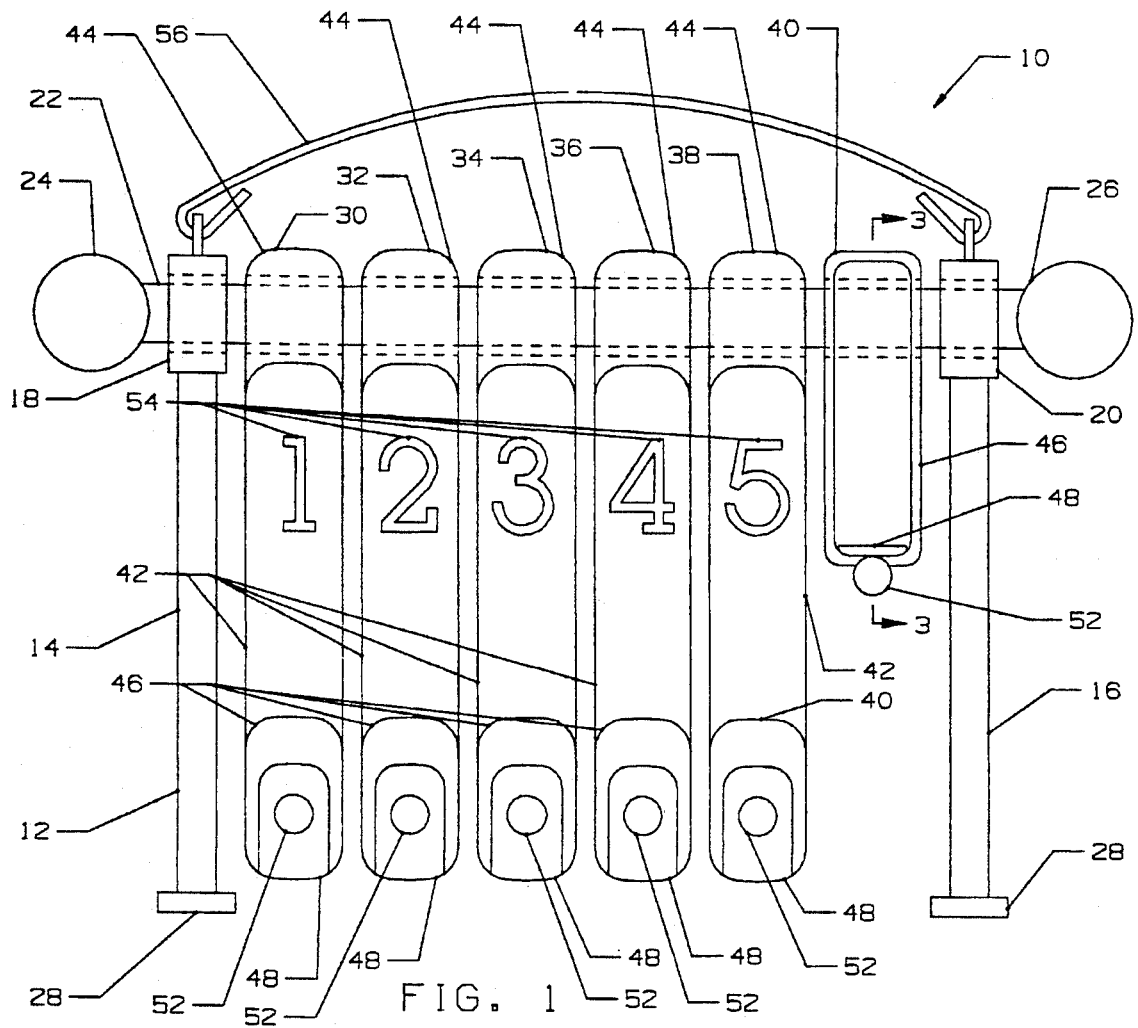
FIG. 1 is a front view of a videotape storage device embodying the present invetion.
Figure 2:
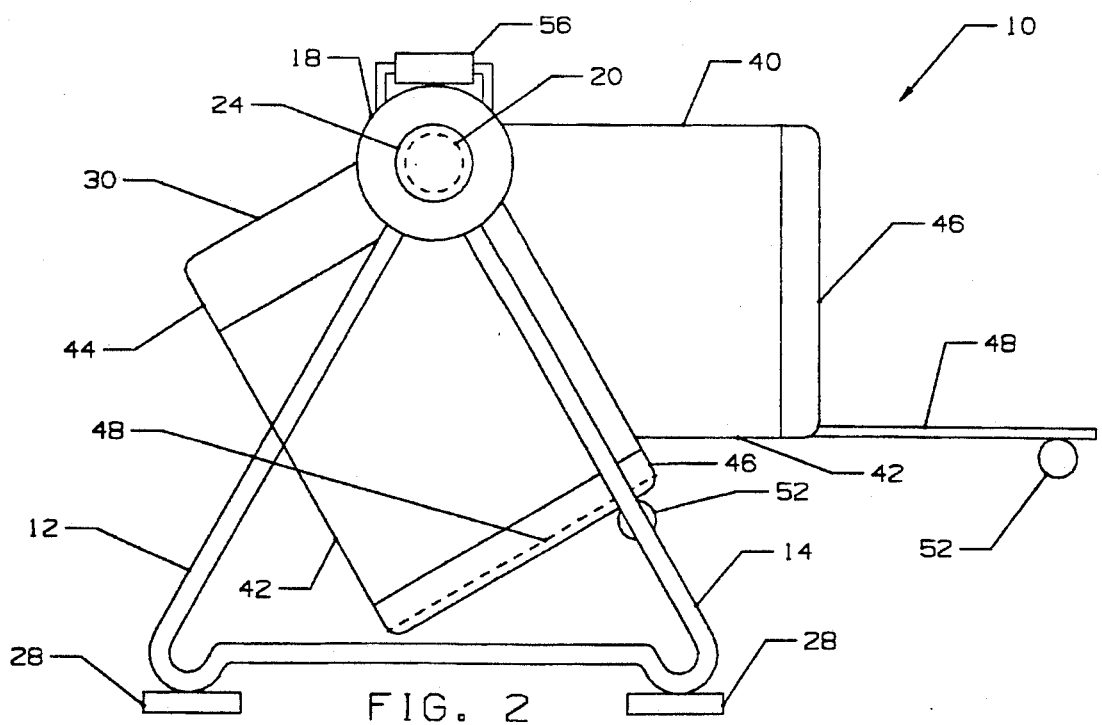
FIG. 2 is a side view of the videotape storage device of FIG. 1.
Figure 3:
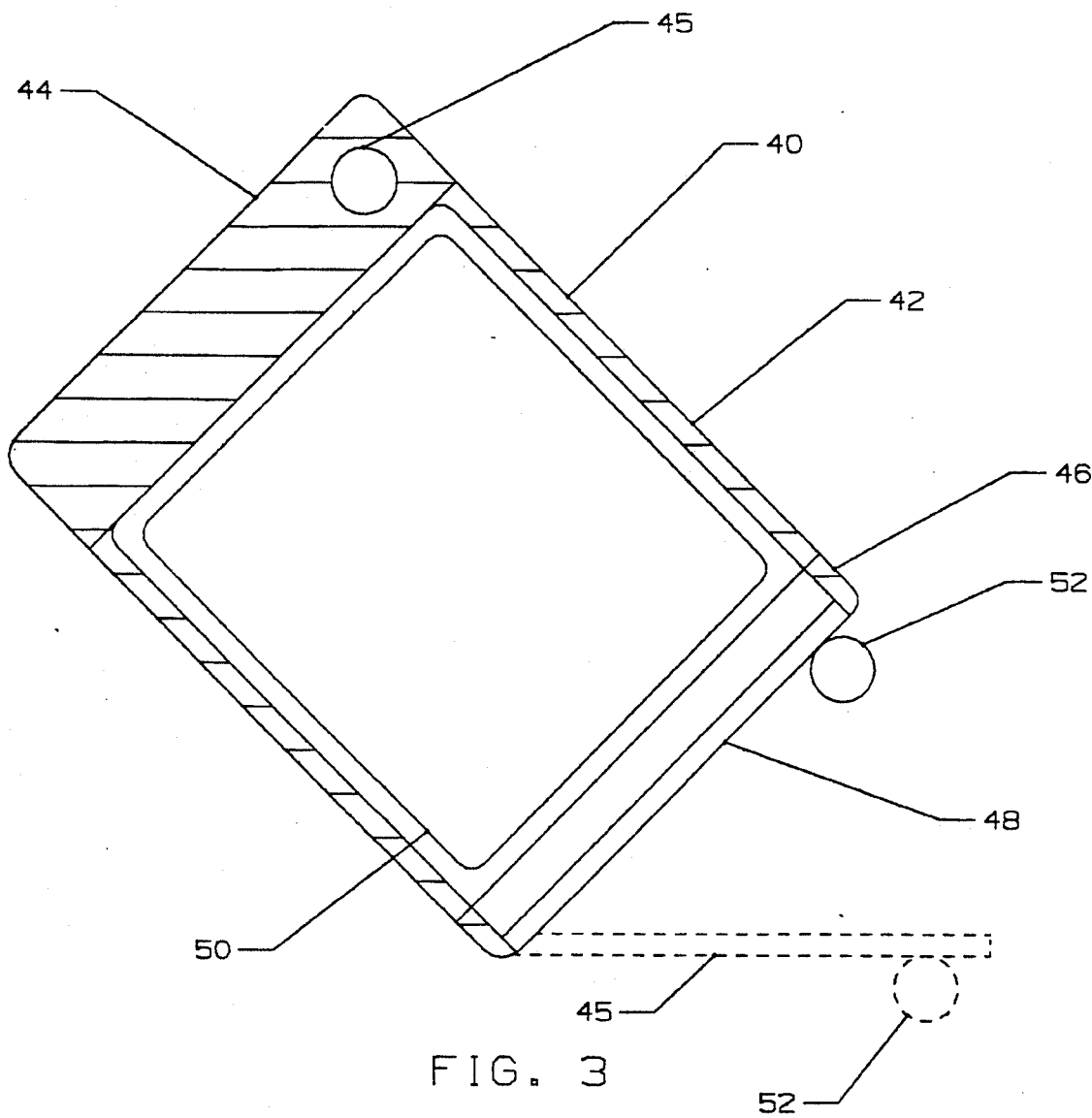
FIG. 3 is longitudinal section through one of the videotape containers of the videotape storage device of FIG. 1, taken on the line 3—3 of FIG. 1.
Figure 4:
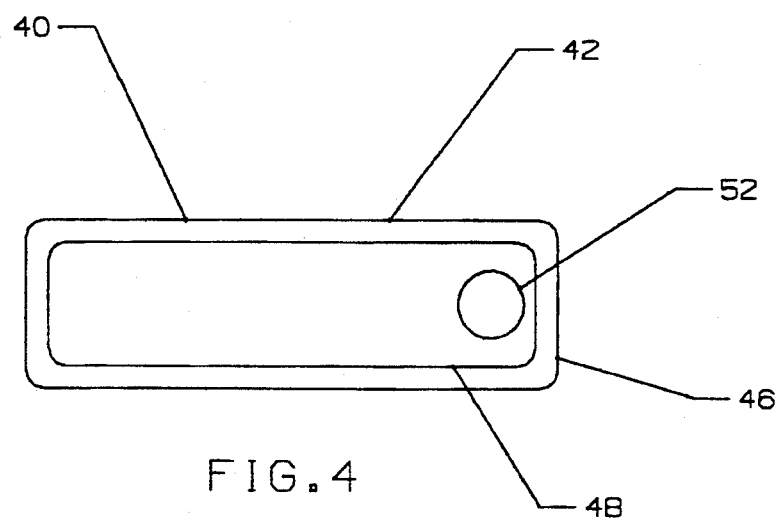
FIG. 4 is a bottom view of the videotape container of FIG. 3.

In that form of the present invention chosen for purposes of illustration in the drawing, FIGS. 1 and 2 show a videotape storage device, indicated generally at 10, comprising a frame 12 formed of a pair of generally triangular legs 14 and 16 having annular bosses at the apex thereof, as seen at 18 and 20, and having a crossbar 22 extending through the bosses 18 and 20 and held in place by knobs 24 and 26 secured to the opposite ends of the crossbar 22. If desired, resilient pads or feet 28 may be provided to prevent the legs 14 and 16 from scratching a supporting surface, such as furniture, not shown. Between the legs 14 and 16, a plurality of videotape containers 30, 32, 34, 36, 38 and 40 are pendulously mounted on the crossbar 22. Each of the containers 30, 32, 34, 36, 38 and 40 is a generally rectangular, hollow, box-like member 42, sized to conveniently receive a videotape cassette, and having a closed upper end 44, formed with an opening 45 extending therethrough to receive the crossbar 22. The lower end 46 of the member 42 has a door portion 48, which is hingedly attached thereto and which frictionally engages the lower end 46 to retain the door portion 48 in its closed position and to retain a videotape, such as shown at 50, within the container 42, and has suitable handle means, such as knobs 52, mounted on the outside surface of the door portion 48 to facilitate opening and closing the door portion 48 to permit insertion and removal of a videotape. Preferably, the containers 42 are each colored a respective color, such as red, orange, yellow, blue, green and purple. In addition, if desired, respective indicia, such as numbers 54, many be provided on the containers 42 to help a user identify a desired one of the containers 42 and, hence, to locate a desired videotape. Finally, is desired, a suitable carrying handle, such as strap 56 may be provided to facilitate transportation of the videotape storage device 10 and the videotapes contained therein.

In use, a plurality of videotapes 50 are provided and each is placed in a respective one of the videotape storage containers 42, by grasping the handles 52 to open the door portions 48, inserting a respective one of the videotapes 50 into a respective one of the containers 42 and closing the door portions 48 to retain the videotapes 50 within the containers 42. The containers 42 will protect the videotapes 50 against dust, sunlight, etc. and will store the videotapes 50 until desired. Normally, the containers 42 will hang pendulously from the crossbar 22, as container 30 is shown in FIGS. 1 and 2. If desired, a child can play with the device 10 by pushing the containers 30, 32, 34, 36, 38 and 40 to cause the containers 30-40 to rock backward and forward on the crossbar 22, either individually or in groups. If the child desires to play a videotape, the respective coloring of the containers 42, and the indicia 54, if provided, will allow even very young children to distinguish the respective containers 30-40 and to select a desired one of the container 42 and, hence, the desired videotape 50 contained within the container 42. To remove the videotape 50, the user rocks the desired container 42 to a horizontal position, such as that of container 40 in FIGS. 1 and 2, and opens the door portion 48, by pulling on the handle 50. When the user has finished watching the videotape 50, he inserts the videotape 50 into the appropriate one of the containers 30-40 and closes the door portion 48, by pushing on the handle 50, to frictionally retain the door portion 48 and, hence, to store the videotape 50 within the container 42 until it is again desired.

Obviously, numerous variations and modifications can be made without departing from the spirit of the present invention. Therefore, it should be clearly understood that the forms of the present invention described above and shown in the figures of the accompanying drawings are illustrative only and are not intended to limit the scope of the present invention.

What is claimed is:

1. A videotape cassette storage device comprising:

A frame having a pair of spaced side legs and an upper cross-bar interconnecting said legs;

a plurality of videotape cassette containers, each of said containers being generally rectangular having a plurality of interconnected walls forming the same, each container having four corners and having an upper end and a lower end, and having an opening extending therethrough at the upper end thereof adjacent one of said corners, said cross-bar extending through said openings of said containers thereby pendulously supporting said containers on said cross-bar, the configuration of said openings and the cross-section of said cross-bar allowing freely movable rotation of said containers on said cross-bar, at least some of said containers having contrasting indicia therein; and a normally closed door portion at the lower end of each of said containers forming a lower wall on each of said containers and door opening and container lifting means associated with each of said lower walls for both lifting each of said containers and opening each of said door portions for removing videotape cassettes from each of said containers.

2. In the device of claim 1 wherein said legs are generally triangular and of an open framework, said cross-bar extending through the apices of said legs.

3. In the device of claim 1 wherein said indicia are contrasting colors.

4. In the device of claim 1 wherein said indicia are different numbers.

5. In the device of claim 1 wherein each of said door portion is hinged to a respective container.

6. In the device of claim 5 wherein said door portions frictionally engage said containers in said closed position.

7. In the device of claim 1 wherein said opening through each of said containers is of a diameter sufficient to allow each of said containers to rock on said cross-bar.

8. In the device of claim 1 wherein said cross-bar and said openings are round in cross-section.

* * * * *